Figure 1:
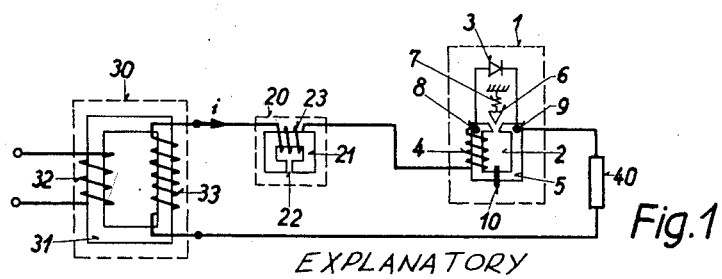

Nov. 11, 1952    F. KESSELRING ET AL    2,617,974

ELECTRIC CONVERTING APPARATUS

Filed April 13, 1949

EXPLANATORY

INVENTORS
Fritz Kesselring &
Erwin Wettstein.
BY
C. M. Avery
ATTORNEY

Patented Nov. 11, 1952

2,617,974

UNITED STATES PATENT OFFICE 2,617,974

ELECTRIC CONVERTING APPARATUS

Fritz Kesselring, Zollikon-Zurich, and Erwin Wettstein, Zurich, Switzerland, assignors to FKG Fritz Kesselring Geratebau Aktiengesellschaft, Bachtobel-Weinfelden, Switzerland, a Swiss company Application April 13, 1949, Serial No. 87,212
In Switzerland April 15, 1948

9 Claims. (Cl. 321—48)

Our invention relates to electric rectifiers, inverters, frequency changers or the like current converting apparatus.

It has been proposed (in the copending application of Fritz Kesselring, Serial No. 656,562, filed March 23, 1946) to convert electric current by means of electromagnetic switches and parallel connected valves, and to provide a saturable reactor for flattening the current characteristic near the current zero passages to make the switch operate substantially without sparking.

Referring to such converters, it is an object of our invention to improve the converter efficiency in particular by reducing the electric losses within the converter system. Another object of our invention is to reduce the material and space requirements of such converters.

These and other objects, as well as the means provided by the invention for achieving them, will be apparent from the following description in conjunction with the drawing, in which:

Figure 1 is explanatory and shows schematically a single-phase circuit diagram of a converter system of the type to which the present invention is directed; and Figs. 2 to 7 show the respective circuit diagrams of six different embodiments of the invention proper.

The single-phase converter system shown in Fig. 1 operates as a rectifier. The rectifying unit proper is denoted by 1. It comprises an electromagnetic high-speed switch 2 of synchronous operation, and a valve 3 parallel connected to the contact means of the switch. The switch 2 has a control coil 4 on a magnetic circuit 5. The appertaining armature 6 is biased by a spring 7 toward the open position. The pole shoes 8 and 9 of the magnetic circuit 5 are electrically insulated from each other by an insert 10 and represent also the stationary contacts of the switch, while the armature 6 serves as a movable contact bridge. A saturable switching reactor 20 is series connected with the switch 2 for flattening the current curve near the current zero passages to provide a weak-current interval within which the switch 2 can close and open its contacts without sparking. The reactor 20 has a magnetic circuit 21 with an air gap 22 and a reactance winding 23. A single-phase transformer 30 has another magnetic circuit 31 with a primary 32 for connection to an alternating current supply line and a secondary 33 to which the converter circuit is connected. The load of the converter circuit is schematically shown at 40. The operation of the system according to Fig. 1 is as follows. During the active half-cycle periods, current $i$ induced in transformer winding 33 flows through winding 23 of reactor 20, and through winding 4 of switch 2 to contact 8. Assuming that the current has just passed through a zero value and has still a low instantaneous magnitude insufficient to close the switch, the current flows from contact 8 through valve 3 to the load 40 and back to the secondary 33 of transformer 30. As soon as the instantaneous magnitude of the current exceeds the response value of switch 1, the armature 6 is attracted and interconnects the contact points 8 and 9 so that valve 3 is shorted and the load current passes through the switch contacts rather than the valve. This condition continues until the current has passed beyond its maximum value and approaches the next current zero passage. Then the reactor 20 produces an interval in which the current remains close to zero. Then the magnetic holding force of the switch 2 is too low to hold the armature 6 against its bias. Hence, the switch contacts open at the beginning of the weak-current interval. From now on, the low current passes again through the valve 3 until the current drops below zero. The unit 1 remains blocked during the next following half-wave period.

A system according to Fig. 1 has several shortcomings. The switch 1, the reactor 20, and the transformer 30 must each have a winding for the full-load current. This requires a large amount of copper and causes correspondingly high electric copper losses. Due to various inductances (stray inductance of the transformer, residual inductance of the reactor in the saturated state, and self-inductance of the switch) an undesirably high voltage drop may be incurred. The switch reactor and transformer also require a relatively large quantity of iron, and the total equipment requires relatively much space. The cost of the complete equipment is correspondingly high.

The above-mentioned disadvantages are eliminated or greatly reduced by the present invention. According to the invention, an electric converting apparatus of the general type above described is designed so that one of the windings traversed by the current to be converted is inductively linked with the magnetic circuit of the magnetic switch as well as with at least one of the other magnetic circuits.

According to a more specific feature of the invention, the same turns of a winding are common to the magnetic circuit of the periodic switch and to the magnetic circuit of a reactor for modifying the current to be converted. This reactor may be a switching reactor for producing a weak-current interval of at least $10^{-4}$ seconds duration for currents of 50 or 60 C. P. S.; or the reactor may serve for securing a predetermined current-voltage characteristic. The magnetic circuit of the reactor is either provided with an air gap or is closed and premagnetized.

According to another feature of the invention, a winding on the magnetic circuit of the periodic switch is inductively linked with the magnetic circuit in the source of the current to be converted, for instance, with the magnetic circuit of a transformer or generator.

Another feature according to the invention provides for an inductive linkage of the winding on the magnetic switch circuit with both the magnetic circuit of a reactor and all or part of the magnetic circuit for the current supplying transformer or generator.

The foregoing features are exemplified by the converting apparatus shown in Figs. 2 through 7. According to Figs. 2, 3, and 4, the electromagnetic converter switch is inductively combined with a switching reactor. In the embodiment according to Fig. 5, the converter switch is combined with a transformer, and in the embodiments according to Figs. 6 and 7 the switch is combined with a reactor as well as with a transformer. In all figures, similar parts are denoted by the same respective reference numerals.

Figure 2:
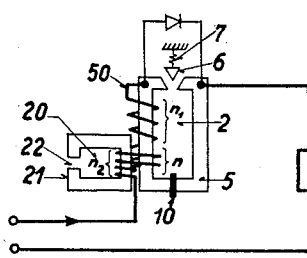

The apparatus shown in Fig. 2 has a converter switch 2 and a switching reactor 20 series-connected with each other in the circuit of the load 40. It is assumed that the terminals of the illustrated circuit are connected to a source of alternating current to be rectified, for instance, to a transformer as shown in Fig. 1. The winding of the two magnetic circuits shown in Fig. 2 is denoted by 50. This winding has a number ($n_1$) of turns inductively linked only with the magnetic circuit 5 of the electromagnetic converter switch 2. A number ($n$) of turns of winding 50 are linked with the magnetic circuit 5 of switch 2 as well as with the magnetic circuit 21 of reactor 20; and winding 50 has also a number ($n_2$) of turn linked only with the magnetic circuit 21 of reactor 20. The magnetic circuit 21 has a relatively large air gap 22, or an equivalent shim of high reluctance, so that there is no appreciable saturation at least during the normal operation of the system. As a result, the reactor 20 produces merely an increased inductive voltage drop which may be useful for obtaining a predetermined current-voltage characteristic, for instance, a given charging characteristic of a rectifier.

Figure 3:
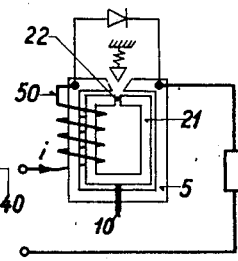

In the embodiment according to Fig. 3, all turns of the winding 50 are inductively linked with the magnetic circuit 5 of the switch as well as with the magnetic circuit 21 of a choke coil to serve as a switching reactor. The air gap 22 of the magnetic circuit 21 is dimensioned for sufficiently biasing the magnetization characteristic to produce a weak-current interval at least partially ahead of each current zero passage.

Figure 4:
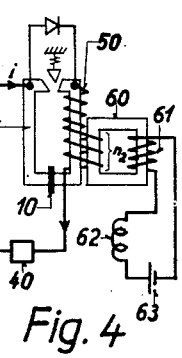

The embodiment according to Fig. 4 has a different design of the magnetic circuits linked by the winding 50. The winding 50, traversed by the current to be rectified, has all its turns linked with the magnetic circuit 5 of the switch. A number ($n_2$) of these turns are also linked with a closed magnetic circuit 60 of a switching reactor. A winding 61 serves to premagnetize the magnetic circuit 60 and is connected with a direct current source 63 through a stabilizing reactor 62. The premagnetization, though requiring additional circuit means, makes it possible to reduce the size of the magnetic reactor circuit because the utilizable induction is considerably larger than with a reactor whose magnetic circuit is interrupted by an air gap.

Figure 5:
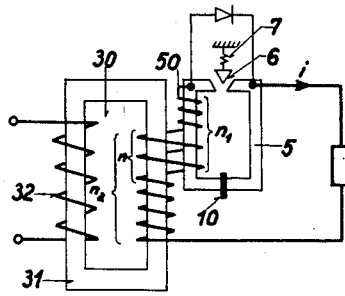

In the embodiment according to Fig. 5, the periodic switch of a contact rectifier is inductively combined with a transformer 30 that produces the current to be rectified. The appertaining winding 50 has a number ($n_1$) of turns inductively linked with the magnetic circuit 5 of the switch. A number of $n_3$ turns of winding 50 are linked with the magnetic circuit 31 of the transformer 30, and a number of $n$ turns are linked with both magnetic circuits 5 and 31. The $n_3$ turns of winding 50 represent also the secondary winding of the transformer 30 whose primary winding 32 is connected to an alternating current line. A rectifier according to this embodiment is of advantage, for instance, when the switching conditions are so moderate that a weak-current interval may be dispensed with.

Figure 6:
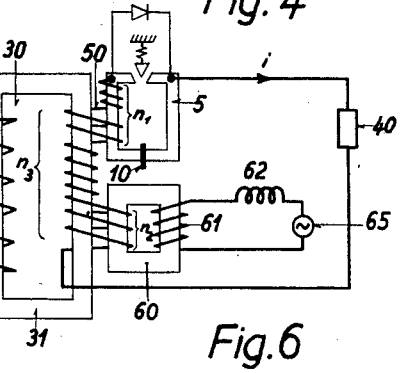

Fig. 6 shows an embodiment in which the winding 50 traversed by the current $i$ to be rectified is inductively linked with a total of three magnetic circuits, namely, by $n_1$ turns with the magnetic circuit 5 of the rectifier switch, by $n_3$ turns with the magnetic circuit 31 of the current-supply transformer 30, and by $n_2$ turns with the closed magnetic circuit 60 of a reactor. The magnetic circuit 60 is premagnetized by a coil 61 which is connected through a choke coil 62 with an alternating current source 65.

Figure 7:
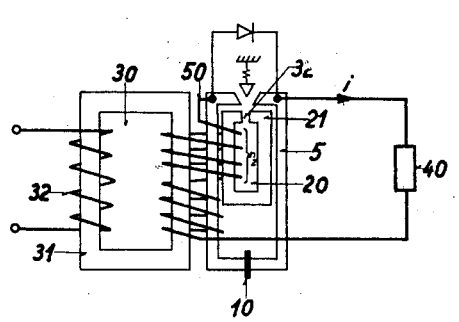

In the embodiment according to Fig. 7, the winding 50 traversed by the current $i$ to be converted has all turns inductively linked with the magnetic circuit 5 of the switch as well as with the magnetic circuit 31 of the transformer 30, while only $n_2$ turns of winding 50 are linked with the open magnetic circuit 21 of a reactor 20. In this embodiment the winding 50 represents the entire secondary winding of transformer 30.

It will be recognized from the above-described embodiments that it is possible to inductively link a single winding in the electric load circuit of a contact converter with the various magnetic circuits of the apparatus to achieve the special performance desired for a particular application. For instance, if it is intended to secure a minimum current value at which the electromagnetic converter switch is to respond, the magnetic circuit of this switch is preferably linked with the secondary winding of the transformer by a number of turns as large as possible. If the switching reactor is to produce only a small additional voltage drop, its magnetic circuit is preferably linked with that of the switch by only a relatively small number of turns and its iron cross section is given correspondingly large dimensions. For smaller values of transmitted power, it is generally preferable to employ reactors with open magnetic circuits without premagnetization, while reactors with closed magnetic circuits, premagnetized by direct or alternating current, are usually preferable for the transmission of larger power values. Depending upon the desiderata or requirements of the various applications, the different magnetic circuits may be composed of the same or different ferromagnetic materials. In particular, it is often advantageous to use for the magnetic circuit of the switching reactor a material of low coercive force and low eddy current losses. For high power applications, the cooling system of a transformer may be used also for cooling the converter switch and the switching reactor. High voltage rectifiers may be designed so that the switching reactor and the converter switch with the appertaining valve are arranged within the insulating liquid of the transformer.

An especially favorable design according to the invention is obtained if the respective iron cores of the transformer, switch and reactor are all mounted within the enclosure of the transformer.

In such a design, the switch contacts 8, 9 with the armature 6 and the valve 3 are preferably arranged on the cover of the switch housing. Such a design results in a compact transformer-type unit with input terminals on one side for applying alternating or three-phase current, while the rectified current is taken from the other side of the unit.

With a corresponding control of the valve, apparatus according to the invention can also operate as an inverter having its frequency controlled by the alternating-current supply line or by a resonant circuit.

A main advantage of rectifiers and inverters according to the invention consists in a considerable reduction in material and space requirements. Another essential advantage is an increase in efficiency due to the fact that the low voltage drop at the contacts of the converter switch, amounting to only a fraction of one volt, is combined with reduced copper losses which only slightly exceed those of a normal transformer.

We claim:

1. Electric converting apparatus, comprising a periodic electromagnetic switch having contact means and a magnetic circuit for controlling said contact means, a transformer having another magnetic circuit, a saturable switching reactor having another magnetic circuit, winding means disposed on said magnetic circuits and electrically series-connected with said contact means, said winding means having turns common to said first magnetic circuit and at least one of said other magnetic circuits.

2. Electric converting apparatus, comprising a load circuit for utilizing converted current, a current control device having a periodic electromagnetic switch series-connected in said load circuit and a valve connected across said switch, said switch having a magnetic circuit, a saturable switching reactor having another magnetic circuit, and winding means disposed on said magnetic circuits and series-connected with said switch in said load circuit, said winding means having turns common to said two magnetic circuits.

3. In converting apparatus according to claim 5, said other magnetic circuit having a gap of high magnetic reluctance.

4. In converting apparatus according to claim 5, said magnetic circuit of said saturable reactor being closed and having a premagnetizing winding disposed only on said latter magnetic circuit, and an electric energizing circuit connected with said premagnetizing winding.

5. Electric converting apparatus, comprising a transformer device for supplying current to be converted, a reactor device for modifying said current, and a periodic electromagnetic switching device for converting said current, said devices having respective magnetic circuits, and winding means on said magnetic circuits, said winding means having a number of turns individually linked with all three magnetic circuits.

6. Electric converting apparatus, comprising a transformer device for supplying current to be converted, a reactor device for modifying said current, and a periodic electromagnetic switching device for converting said current, said devices having respective magnetic circuits, and winding means on said magnetic circuits, said winding means of said switching device having a group of turns in common with said winding means of said transformer and having another group of turns in common with said winding means of said reactor.

7. Electric converting apparatus, comprising an electric load circuit, an energizing transformer connected to said load circuit, a synchronous electromagnetic switch having contact means series-connected in said load circuit and having a first magnetic circuit for controlling said contact means, a valve connected across said contact means, a saturable switching reactor series-connected with said contact means in said load circuit, said transformer and said reactor having respective other magnetic circuits both magnetically separate from said first magnetic circuit, said first magnetic circuit being adjacent to at least one of said other magnetic circuits, and a magnetizing winding disposed on said first magnetic circuit and series-connected in said load circuit, said winding having turns inductively linked with said adjacent magnetic circuit.

8. Electric converting apparatus, comprising a load circuit for converted current, a current control device having a periodic electromagnetic switch series-connected in said load circuit and a valve connected across said switch, said switch having a first magnetic circuit, a transformer for supplying said current, said transformer having a second magnetic circuit magnetically separate from said first magnetic circuit but adjacent thereto, said two magnetic circuits having winding means series-connected with said switch in said load circuit and having turns common to both said magnetic circuits.

9. Electric converting apparatus, comprising a transformer having a core structure, a load circuit connected to said transformer to be energized therefrom, a synchronous electromagnetic switching device having another core structure, a switching reactor having a saturable core structure, said three core structures being adjacent to one another and having winding means series-connected with said contact means in said load circuit, said winding means having turns disposed only on said transformer core structure and having other turns common to said transformer core structure and said two other core structures.

FRITZ KESSELRING.
ERWIN WETTSTEIN.

REFERENCES CITED

The following references are of record in the file of this patent:

UNITED STATES PATENTS

| Number | Name | Date |
|---|---|---|
| 1,265,354 | Mershon | May 7, 1918 |
| 1,768,750 | Dicke | July 1, 1930 |
| 1,866,147 | Aylsworth | July 5, 1932 |
| 2,113,762 | James | Apr. 12, 1938 |
| 2,285,691 | Wegener | June 9, 1942 |
| 2,300,900 | Armstrong | Nov. 3, 1942 |
| 2,351,975 | Koppelman | June 20, 1944 |
| 2,361,155 | Stevens et al. | Oct. 24, 1944 |
| 2,527,220 | Hughes | Oct. 24, 1950 |

FOREIGN PATENTS

| Number | Country | Date |
|---|---|---|
| 379,667 | Great Britain | Aug. 22, 1932 |